(12) United States Patent
Nystrom et al.

(10) Patent No.: US 9,982,536 B2
(45) Date of Patent: May 29, 2018

(54) METHOD PERTAINING TO A ROCK BOLTING CONFIGURATION, A ROCK BOLTING CONFIGURATION, A VEHICLE COMPRISING A ROCK BOLTING CONFIGURATION AND A COMPUTER PROGRAM PRODUCT

(71) Applicant: Atlas Copco Rock Drills AB, Orebro (SE)

(72) Inventors: Sven-Olov Nystrom, Orebro (SE); Jan Olsson, Orebro (SE)

(73) Assignee: Epiroc Rock Drills Aktiebolag, Orebro (SE)

( * ) Notice: Subject to any disclaimer, the term of this patent is extended or adjusted under 35 U.S.C. 154(b) by 490 days.

(21) Appl. No.: 14/421,860

(22) PCT Filed: Aug. 26, 2013

(86) PCT No.: PCT/SE2013/050996
§ 371 (c)(1),
(2) Date: Feb. 16, 2015

(87) PCT Pub. No.: WO2014/035317
PCT Pub. Date: Mar. 6, 2014

(65) Prior Publication Data
US 2015/0218944 A1    Aug. 6, 2015

(30) Foreign Application Priority Data
Aug. 30, 2012 (SE) .................................. 1250968

(51) Int. Cl.
*E21D 20/00* (2006.01)
*G05B 15/02* (2006.01)
(Continued)

(52) U.S. Cl.
CPC ......... *E21D 20/003* (2013.01); *E21D 20/006* (2013.01); *F16B 19/00* (2013.01); *G05B 15/02* (2013.01); *Y10T 29/49895* (2015.01)

(58) Field of Classification Search
CPC ..... E21D 20/003; E21D 20/006; G05B 15/02; Y10T 29/49895; F16B 19/00
See application file for complete search history.

(56) References Cited

U.S. PATENT DOCUMENTS 4,351,625 A   9/1982   Selestam et al.
5,114,279 A   5/1992   Bjerngren et al.
(Continued)

FOREIGN PATENT DOCUMENTS

CN      101160451       4/2008
SE         465094       7/1991
WO    WO 2006/118504   11/2006

OTHER PUBLICATIONS

Structure and Design of Engineering Machinery, Jun. 30, 2009, p. 277, by Jin Tonghong, Chemistry Industry Press.

*Primary Examiner* — John C Hong
(74) *Attorney, Agent, or Firm* — Mark P. Stone (57) ABSTRACT

The invention relates to a method pertaining to a bolting configuration (299) where a drilling unit and a bolting unit are arranged to be supported by a bottom carriage (330) via a respective top carriage (271; 272), wherein said bottom carriage (330) is arranged to be supported by a feed beam (230), relative to which said bottom carriage (330) is displaceable, wherein said top carriages (271; 272) are arranged to alternately be supported by said bottom carriage (330) to alternately be brought into operative engagement and hereby alternately be locked relative to said bottom carriage (330). The method comprises the step of: —said locking being performed by a locking configuration (350; 351) comprising at least one hydraulically, pneumatically or electrically dis-
(Continued)

placeably arranged locking pin (350) adapted to be inserted into a locking hole (351) during locking, wherein said locking pin (350) is supported by said one top carriage (271; 272) and said locking hole (351) is arranged in said bottom carriage (330), or vice versa. The invention also relates to a computer program product comprising program code (P) for a computer (200; 210) to implement a method according to the invention. The invention also relates to a bolting configuration and a vehicle equipped with the bolting configuration.

18 Claims, 6 Drawing Sheets

(51) Int. Cl.
  *F16D 19/00* (2006.01)
  *F16B 19/00* (2006.01)

(56) References Cited

U.S. PATENT DOCUMENTS

| | | |
|---|---|---|
| 5,690,449 A | 11/1997 | Morrison et al. |
| 6,598,309 B1 | 7/2003 | Coombs |

Fig. 9

METHOD PERTAINING TO A ROCK BOLTING CONFIGURATION, A ROCK BOLTING CONFIGURATION, A VEHICLE COMPRISING A ROCK BOLTING CONFIGURATION AND A COMPUTER PROGRAM PRODUCT

TECHNICAL FIELD

The present invention relates to a method pertaining to a bolting configuration. The invention also relates to a computer program product comprising program for a computer to implement a method according to the invention. The invention also relates to a bolting configuration, and a motor vehicle equipped with the bolting configuration.

BACKGROUND

Today drilling rigs are used for bolting in mining. Said rigs comprise a bolting device, which can be used for drilling holes in mine drifts as well as for bolting. Bolting in mine drifts is advantageous in a number of ways.

According to a known construction, said bolting device comprises a drilling unit and a bolting unit, which are arranged to be supported by a bottom carriage via a respective top carriage. Said bottom carriage is adapted to be supported by a feed beam, relative to which said bottom carriage is displaceable, wherein said top carriages are arranged to be alternately supported by said bottom carriage in order to alternately be brought into operative engagement and hereby alternately be locked relative to said bottom carriage.

The bottom carriage is hereby equipped with a hinged plate, which at a specific position, which allows switching of said top carriages, rotates around a suspension element. Said plate is in operation brought into engagement in a groove of the top carriage that is currently arranged for operation at the bolting device. The rotation of the plate is caused by a fully mechanical mechanism.

A disadvantage of this technique is that the plate is exposed to an undesirable wear, wherein the reliability in operation may be adversely affected. Said wear is difficult or impossible to inspect without disassembling the bolting device for visual inspection.

There is thus a need to achieve a reliable bolting device, in which the locking mechanism of said carriages is easy to inspect continuously.

U.S. Pat. No. 4,351,625 discloses a device for automatic bolting in rock reinforcement operations. The device has a drilling unit, an injector device, a bolting machine and a feed arm. The device also includes a switching mechanism for switching between various functionalities of the device.

SE465094 describes a mechanical locking pin, which by means of a hinged arm is moved to a locked and an unlocked position. The locking pin is moved to the locked position by a spring and comprises a hole in the top carriage when the bottom and top carriage are moved along the feed beam.

SUMMARY OF THE INVENTION

An object of the present invention is to provide a new and advantageous method pertaining to a bolting configuration.

Another object of the invention is to provide a new and advantageous bolting configuration and a new and advantageous computer program pertaining to a bolting configuration.

A further object of the invention is to provide a method, a bolting configuration and a computer program to achieve a robust and reliable operation of said bolting configuration.

A further object of the invention is to provide a method pertaining to a bolting configuration where continuous monitoring of the wear of the bolting configuration is achieved.

These objectives are achieved by a method pertaining to a bolting configuration according to claim 1.

According to an aspect of the invention there is provided a method pertaining to a bolting configuration wherein a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to alternately be supported by said bottom carriage to alternately be brought into operative engagement and hereby alternately be locked relative to said bottom carriage. The method comprises the steps of:

controllably bringing a locking configuration, comprising at least one hydraulically, pneumatically or electrically controlled, axially displaceably arranged locking pin adapted to be inserted into a locking hole during locking, wherein said locking pin is supported by said one top carriage and said locking hole is arranged in said bottom carriage, or vice versa, to a position corresponding to an unlocked state;

by means of a switching configuration switching top carriages at said bottom carriage, such that the other top carriage can be brought into active engagement with said bottom carriage; and controllably bringing the at least one said locking pin to a position corresponding to a locked state, wherein said locking pin is inserted into said locking hole.

Said locking configuration may be controlled, such that locking is performed by four locking pins and four locking holes.

The method may further comprise the step of:
said units being alternately brought into operative engagement by said switching configuration, which comprises switching cylinder means supported by the feed beam.

The method may further comprise the step of:
performing said switching and/or said locking operator-controlled.

The method may further comprise the step of:
displacing said at least one locking pin towards and away from said locking hole by means of a hydraulic cylinder supported by said top carriage.

The method may further comprise the step of:
displacing said at least one locking pin in the longitudinal direction of said feed beam.

According to an aspect of the invention there is provided a method pertaining to a bolting configuration, wherein a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to alternately be supported by said bottom carriage to alternately be brought into operative engagement and hereby alternately be locked relative to said bottom carriage, the method comprising the step of:

said locking being performed by a locking configuration comprising at least one hydraulically, pneumatically or electrically displaceably arranged locking pin adapted for being inserted into a locking hole during locking, wherein said locking pin is supported by said one top carriage and said locking hole is arranged in said bottom carriage, or vice versa.

According to an aspect of the invention, said locking may be performed by four locking pins and four locking holes.

According to an aspect of the invention, the method may comprise the step of:

alternately bringing said units in operative engagement by switching cylinder means supported by said feed beam.

According to an aspect of the invention, said switching and/or said locking may be performed operator-controlled.

According to an aspect of the invention, said at least one locking pin may be displaceable towards and away from said locking hole by means of a hydraulic cylinder supported by said top carriage.

According to an aspect of the invention, said at least one locking pin may be displaceable in the longitudinal direction of said feed beam.

According to an aspect of the invention there is provided a bolting configuration comprising a drilling unit and a bolting unit, which units are arranged to be supported by a bottom carriage via a respective top carriage, wherein said bottom carriage is arranged to be supported by a feed beam, relative to which said bottom carriage is displaceable, wherein said top carriages are arranged to be alternately supported by said bottom carriage to alternately be brought into operative engagement and hereby alternately be locked relative to said bottom carriage. The bolting configuration comprises a locking configuration for said locking, which locking configuration comprises at least one hydraulically, pneumatically or electrically controlled, axially displaceably arranged locking pin adapted to be inserted into a locking hole during locking, wherein said locking pin is supported by said one top carriage and said locking hole is arranged in said bottom carriage, or vice versa.

According to an aspect of the invention there is provided a bolting configuration comprising a drilling unit and a bolting unit, which units are arranged to be supported by a bottom carriage via a respective top carriage, wherein said bottom carriage is arranged to be supported by a feed beam, relative to which said bottom carriage is displaceable, wherein said top carriages are arranged to be alternately supported by said bottom carriage to alternately be brought into operative engagement and hereby alternately be locked relative to said bottom carriage. The bolting configuration may comprise a locking configuration for said locking, which locking configuration comprises at least one hydraulically, pneumatically or electrically displaceably arranged locking pin adapted to be inserted into a locking hole during locking, wherein said locking pin is supported by said one top carriage and said locking hole is arranged in said bottom carriage, or vice versa.

The locking mechanism of the bolting configuration is hereby easy to inspect visually. The proposed solution further provides a locking mechanism, which causes the drilling unit and the bolting unit to be securely locked to the bottom carriage. The locking mechanism is essentially play-free, which ensures a high reliability.

In the bolting configuration, said locking configuration may comprise four locking pins and four locking holes. Hereby is achieved a reliable and robust attachment of said drilling unit and bolting unit to said bottom carriage.

The bolting configuration may further comprise:

means for alternately bringing said units in operative engagement. Said means may comprise switching cylinder means supported by the feed beam.

The bolting configuration may further comprise:

actuator means, which are signal connected to control means, wherein said control means are arranged to control said switching and/or said locking based on control signals from said actuator means. Hereby is advantageously achieved an automated switching between various functions of the bolting configuration.

In the bolting configuration, said at least one locking pin may be arranged displaceably towards and away from said locking hole by means of a hydraulic cylinder supported by said top carriage.

In the bolting configuration, said at least one locking pin may be arranged displaceably in the longitudinal direction of said feed beam.

The above objects are also achieved by a vehicle comprising the bolting configuration. The vehicle may be a drilling rig for mining.

According to an aspect of the invention there is provided a computer program pertaining to a bolting configuration, wherein a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to be alternately supported by said bottom carriage to alternately be brought into operative engagement and hereby alternately be locked relative to said bottom carriage, wherein said computer program comprises program code stored on a, by a computer readable, medium for causing an electronic control unit, or another computer connected to the electronic control unit to perform the step of:

driving a locking configuration for said locking, which locking configuration comprises at least one hydraulically, pneumatically or electrically controlled, axially displaceably arranged locking pin adapted to be inserted into a locking hole during locking, wherein said locking pin is supported by said one top carriage and said locking hole is arranged in said bottom carriage, or vice versa.

According to an aspect of the invention there is provided a computer program product pertaining to a bolting configuration, wherein a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to alternately be supported by said bottom carriage to alternately be brought into operative engagement and hereby alternately be locked relative to said bottom carriage, comprising a program code stored on a, by a computer readable, medium for performing the method step of:

driving a locking configuration for said locking, which locking configuration comprises at least one hydraulically, pneumatically or electrically controlled, axially displaceably arranged locking pin adapted to be inserted into a locking hole during locking, wherein said locking pin is supported by said one top carriage and said locking hole is arranged in said bottom carriage, or vice versa, when said computer program is run on an electronic control unit, or another computer connected to the electronic control unit.

According to an aspect of the invention there is provided a computer program pertaining to a bolting configuration, wherein a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to be alternately supported by said bottom carriage to alternately be brought into operative engagement and hereby alternately be locked relative to said bottom carriage, said computer program comprising program code stored on a, by a computer readable, medium for causing an electronic control unit, or another computer connected to the electronic control unit to perform the step of:

driving a locking configuration for said locking, which locking configuration comprises at least one hydraulically, pneumatically or electrically displaceably arranged locking pin adapted to be inserted into a locking hole during locking, wherein said locking pin is supported by said one top carriage and said locking hole is arranged in said bottom carriage, or vice versa.

According to an aspect the invention there is provided a computer program product pertaining to a bolting configuration, wherein a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to alternately be supported by said bottom carriage to alternately be brought into operative engagement and hereby alternately be locked relative to said bottom carriage, comprising a program code stored on a, by a computer readable, medium for performing the method step of:

driving a locking configuration for said locking, which locking configuration comprises at least one hydraulically, pneumatically or electrically displaceably arranged locking pin adapted to be inserted into a locking hole during locking, wherein said locking pin is supported by said one top carriage and said locking hole is arranged in said bottom carriage, or vice versa, when said computer program is run on an electronic control unit, or another computer connected to the electronic control unit.

Additional objects, advantages and novel features of the present invention will become apparent to those skilled in the art from the following details, as well as by practice of the invention. Even though the invention is described below, it should be apparent that the invention is not limited to the specific details described. Persons skilled in the art having access to the teachings herein will recognize additional applications, modifications and incorporations in other fields, which are within the scope of the invention.

BRIEF DESCRIPTION OF THE DRAWINGS

For a more complete understanding of the present invention and further objects and advantages thereof, reference is now made to the following detailed description to be read together with the accompanying drawings wherein the same references refer to the same parts in the various figures, and in which.

DETAILED DESCRIPTION OF THE DRAWINGS

Figure 1:
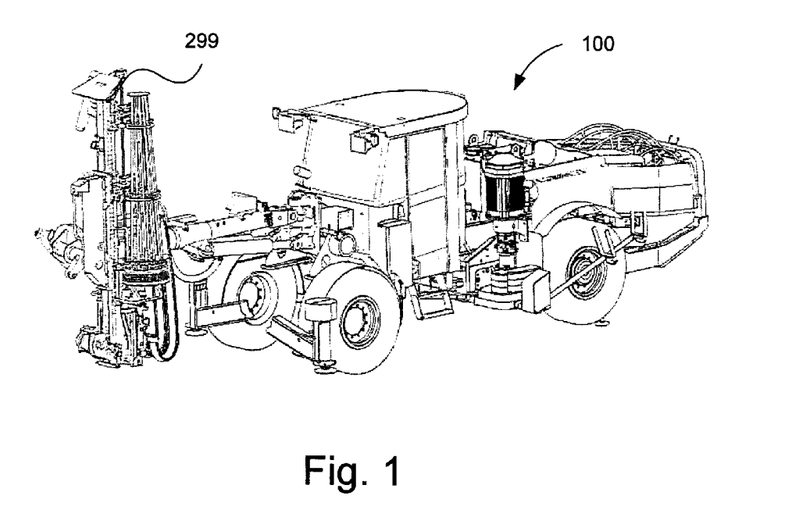
FIG. 1 schematically illustrates a vehicle, according to an embodiment of the invention.

Referring to FIG. 1, a vehicle 100 is illustrated. The exemplified vehicle 100 is according to an embodiment a so-called drilling rig for mining. The vehicle 100 may be a motor vehicle with 4, 6 or 8 wheels, wherein a suitable number of drive wheel sets are arranged at the vehicle 100.

The vehicle 100 is provided with the inventive device 299 for bolting.

The vehicle 100 may be operator-controlled, whereby one or more operators may be on board the vehicle during propulsion of the vehicle. According to an alternative the vehicle 100 is remote controlled, whereby one or more operators may be positioned at a control centre located above ground. According to an alternative the vehicle is arranged for autonomous control.

Herein the term "link" relates to a communication link which may be a physical line such as an opto-electronic communication line, or a non-physical line such as a wireless connection, for example a radio or microwave link.

Figure 2:
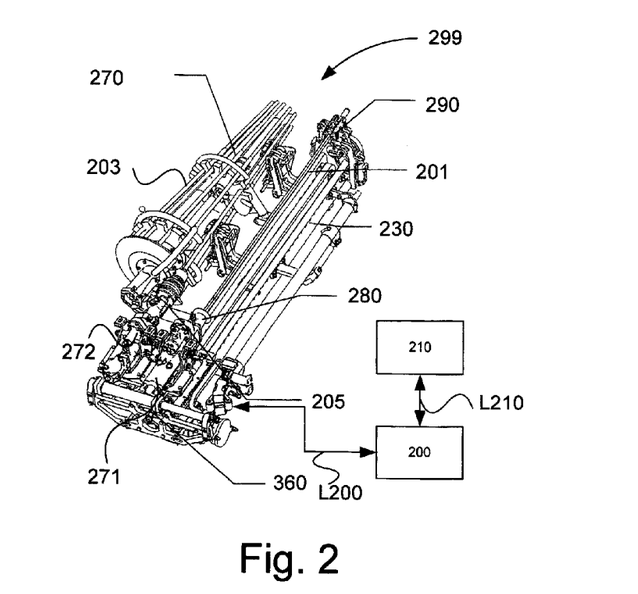
FIG. 2 schematically illustrates a bolting configuration, according to an embodiment of the invention.

FIG. 2 shows an apparatus 299 for bolting. The device 299 is arranged at the vehicle 100 as described with reference to FIG. 1.

The device 299 comprises a feed beam 230 along which a first carriage 271 and a second carriage 272 are arranged to alternately be used in the operation of the device 299. In FIG. 2, the first carriage 271 is in position for operation. Next to said first carriage 271 is said second carriage 272 arranged. Said second carriage 272 may be brought into position for operation by a switching configuration 360. Said switching configuration 360 may include one or more switching cylinders. Said switching configuration 360 is arranged to switch between said first carriage 271 and said second carriage 272, to achieve desirable functionality of the device.

Said first carriage 271 is arranged to hold a drilling unit including a drill steel 201 for drilling a hole. Said drill steel 201 may be an extension drill steel for drilling relatively deep holes. Said second carriage 272 is arranged to hold a bolting unit for insertion of a bolt 203 into a drilled hole for rock reinforcement.

The device 299 comprises a drill support device 290. Said drill support device 290 is arranged to, where applicable, hold a drill steel when drilling.

The device 299 comprises drive means 280 for driving said drilling unit during drilling. Said drive means 280 may be a rock drill of appropriate dimensions and driving power.

The device 299 comprises a bolt magazine 270. Said bolt magazine 270 is arranged at a first side of the device 299. Said first magazine 270 is arranged to detachably hold a number of bolts 203. Said bolts 203 may, where applicable, automatically be brought into operative engagement by attachment to the second carriage 272. It should be noted that said bolts 203 may be of mutually different sizes and types. Said bolts 203 may include fastening means such as barb means or anchoring devices, or other suitable means for firmly installing said bolts in drilled holes.

The device comprises drive means (not shown) for moving said first carriage 221 and said second carriage 222 along the feed beam 230. Said drive means may comprise a motor and drive chain.

The device 299 comprises a first control unit 200. The first control unit 200 is arranged to automatically control operation of the device 299. The first control unit 200 is arranged to control the operation of the parts included in the device 299, for example, said switching configuration 360, said drive means and said rock drill 280.

A second control unit 210 is arranged for communication with the first control unit 200 via a link L210. The second control unit 210 may be detachably connected to the first control unit 200. The second control unit 210 may be an external control unit to the vehicle 100. The second control unit 210 may be arranged to perform the inventive method steps according to the invention. The second control unit 210 may be used to load software into the first control unit 200, particularly software for performing the inventive method. The second control unit 210 may alternatively be arranged for communication with the first control unit 200 via an internal network in the vehicle. The second controller 210 may be arranged to perform substantially identical functions as the first control unit 200.

FIG. 2 illustrates only one link L200, which is arranged for communication with a part of the device 299. In this example is provided a possibility for the first control unit 200 to control the operation of said bolting unit by means of control signals via said link L200. Hereby, the first control unit 200 is arranged to lock and unlock the locking mechanism of the carriage 271 or 272 by affecting the electrical, pneumatic or electrical actuator means. The device 299 may comprise a number of links for control of the various constituent parts of the device 299. These links have however been omitted to make FIG. 2 clear.

According to an example, the first control unit 200 is arranged to control the operation of said switching configuration and locking mechanism by suitable hydraulic equipment (not shown). According to an example, the first control unit 200 is arranged to control the operation of said switching configuration and locking mechanism by suitable electromechanical equipment (not shown). According to an example, the first control unit 200 is arranged to control the operation of said switching configuration and locking mechanism by suitable pneumatic equipment (not shown).

An operator may, by actuator means (not shown), signal connect to the first control unit 200, actively control device 299 and in particular control the operation of the lock mechanism and switching configuration 360.

According to an alternative, an operator may initiate and monitor operation of said lock mechanism and switching configuration 360 according to the inventive method by means of a computer (not shown) and suitable user interface. Said computer is signal connected to the first control unit 200.

Figure 3:
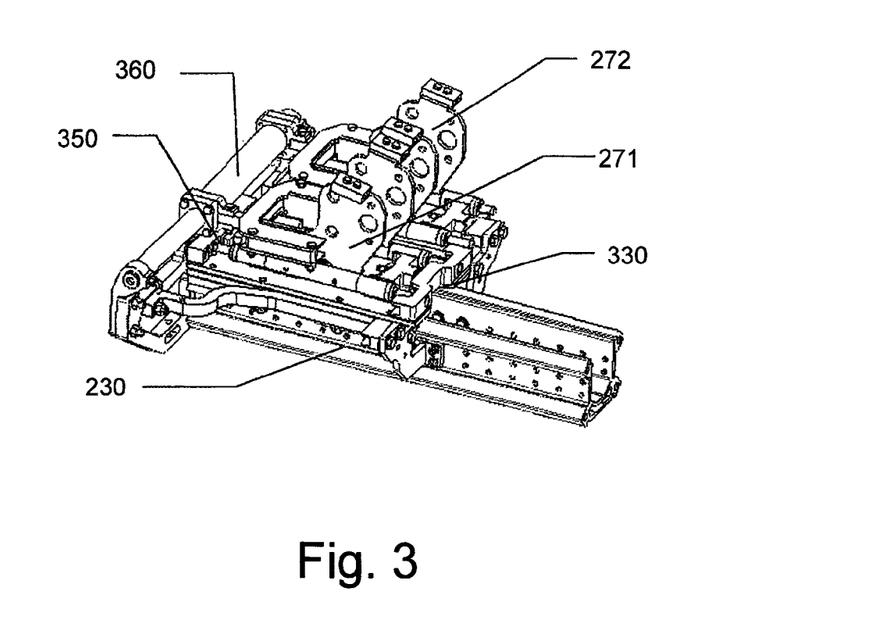
FIG. 3 schematically illustrates a carriage switching configuration, according to an embodiment of the invention.

FIG. 3 schematically illustrates a carriage switching configuration, according to an embodiment of the invention.

Hereby is illustrated said feed beam 230 at which said bottom carriage 330 is arranged. Said bottom carriage 330 is arranged to be guided by slide rails arranged at the feed beam 230. Said first top carriage 271 and said second top carriage 272 may alternately be brought into operative engagement with said bottom carriage 330 by a number of pins 350. Only one locking pin 350 is indicated in FIG. 3.

A switching configuration 360 is arranged to, when applicable, switch between said first top carriage 271 and said second top carriage 272 when said bottom carriage 330 is in a specific position, whereby the function of the bolting configuration 299 can be alternated. Said switching configuration 360 may comprise at least one switching cylinder. Said first control unit 200 is arranged to control said switching means to achieve desirable functionality of said bolting configuration 299, typically drilling function and bolting function.

Said first top carriage 271 is arranged with a holder for a drilling unit including equipment to achieve drilling of holes. Said second carriage 272 is arranged with a holder for a bolting unit including equipment to achieve bolting in said drilled holes.

Said bolting configuration 299 comprises according to an embodiment said drilling unit and said bolting unit. These units are arranged to be supported by said bottom carriage 330 via a respective top carriage 271 and 272. Said bottom carriage 330 is arranged to be supported by said feed beam 230, relative to which said bottom carriage 330 is displaceable. Said top carriages 271 and 272 are arranged to alternately be supported by said bottom carriage 330 to alternately be brought into operative engagement and hereby alternately be locked relative to said bottom carriage 330. The bolting configuration 299 may comprise a locking configuration with a number of suitably configured pins 350 for said locking. Said pins 350 are hydraulically displaceably arranged locking pins adapted to be inserted into corresponding locking holes during locking. Hereby is the bolting configuration equipped with suitable hydraulic means (not shown), which in a controlled manner may achieve locking respectively unlocking of a top carriage relative to said bottom carriage 330. Said first control unit 200 is arranged to control said locking respectively unlocking suitably. According to a version, said controlling is achieved by an operator by means of a computer (not shown) and suitable user interface, alternatively by means of suitable actuator means (not shown). Said locking pins 350 may, according to an embodiment, be suitably configured lock cylinders. Said locking pins 350 are supported by said top carriages 271 and 272 and said corresponding locking holes are arranged in said bottom carriage 330. According to an alternative embodiment said locking pins 350 are supported by said bottom carriage 330 and said corresponding locking holes are arranged in said top carriages 271 and 272.

Said bolting configuration 299 comprises according to an embodiment said drilling unit and said bolting unit. These units are arranged to be supported by said bottom carriage 330 via a respective top carriage 271 and 272. Said bottom carriage 330 is arranged to be supported by said feed beam 230, relative to which said bottom carriage 330 is displaceable. Said top carriages 271 and 272 are arranged to alternately be supported by said bottom carriage 330 to alternately be brought into operative engagement and hereby alternately be locked relative to said bottom carriage 330. The bolting configuration 299 may comprise a locking configuration with a number of suitably configured pins 350 for said locking. Said pins 350 are pneumatically displaceably arranged locking pins adapted to be inserted into corresponding locking holes during locking. Hereby is the bolting configuration equipped with suitable pneumatic means (not shown), which in a controlled manner may achieve locking respectively unlocking of a top carriage relative to said bottom carriage 330. Said first control unit 200 is arranged to control said locking respectively unlocking suitably. According to a version, said controlling is achieved by an operator by means of a computer (not shown) and suitable user interface, alternatively by means of suitable actuator means (not shown). Said locking pins 350 may according to an embodiment be suitably configured lock cylinders. Said locking pins 350 are supported by said top carriages 271 and 272 and said corresponding locking holes are arranged in said bottom carriage 330. According to an alternative embodiment said locking pins 350 are supported by said bottom carriage 330 and said corresponding locking holes are arranged in said top carriages 271 and 272.

Said bolting configuration 299 comprises according to an embodiment said drilling unit and said bolting unit. These units are arranged to be supported by said bottom carriage 330 via a respective top carriage 271 and 272. Said bottom carriage 330 is arranged to be supported by said feed beam 230, relative to which said bottom carriage 330 is displaceable. Said top carriages 271 and 272 are arranged to alternately be supported by said bottom carriage 330 to alternately be brought into operative engagement and hereby alternately be locked relative to said bottom carriage 330. The bolting configuration 299 may comprise a locking configuration with a number of suitably configured pins 350 for said locking. Said pins 350 are electrically displaceably arranged locking pins adapted to be inserted into corresponding locking holes during locking. Hereby is the bolting configuration equipped with suitable electrical means (not shown), which in a controlled manner may achieve locking respectively unlocking of a top carriage relative to said bottom carriage 330. Said first control unit 200 is arranged to control said locking respectively unlocking suitably. According to a version, said controlling is achieved by an operator by means of a computer (not shown) and suitable user interface, alternatively by means of suitable actuator means (not shown). Said locking pins 350 may according to an embodiment be suitably configured lock cylinders. Said locking pins 350 are supported by said top carriages 271 and 272 and said corresponding locking holes are arranged in said bottom carriage 330. According to an alternative embodiment said locking pins 350 are supported by said bottom carriage 330 and said corresponding locking holes are arranged in said top carriages 271 and 272.

Figure 4:
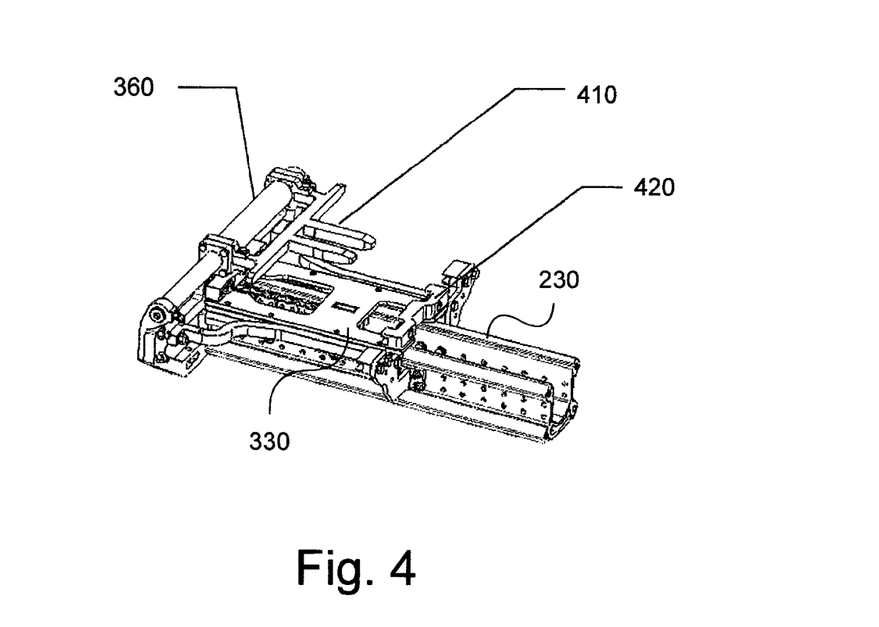
FIG. 4 schematically illustrates a carriage switching configuration, according to an embodiment of the invention.

FIG. 4 schematically illustrates a carriage switching configuration, according to an embodiment of the invention.

Herein is said bottom carriage 330 illustrated in further detail. Said bottom carriage 330 is slidably arranged at said feed beam 230. Said switching configuration 360 is thereby equipped with a switching tool for achieving relative movement of said first top carriage 271 and said second top carriage 272. Hereby is provided a switching between the two top carriages 271 and 272.

Figure 5:
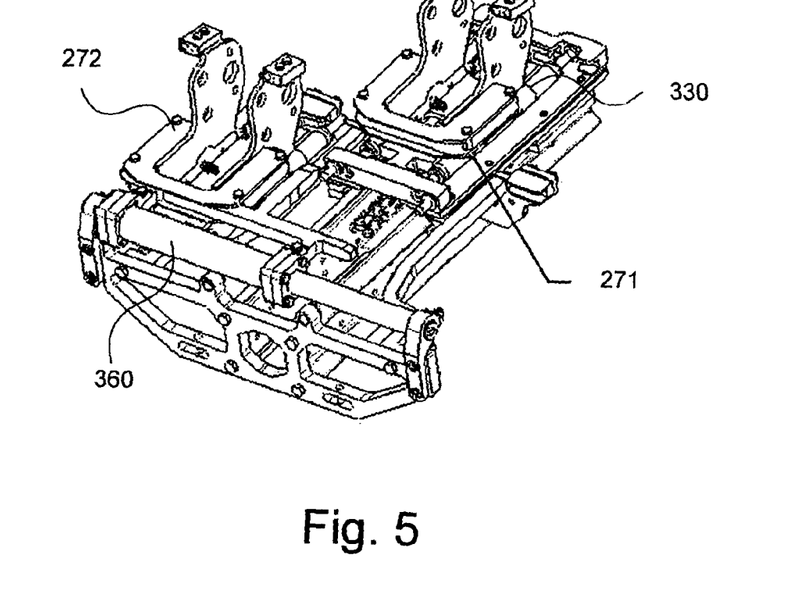
FIG. 5 schematically illustrates a carriage switching configuration, according to an embodiment of the invention.

FIG. 5 schematically illustrates a carriage switching configuration, according to an embodiment of the invention.

Hereby, the first top carriage 271 is arranged in operative engagement with said bottom carriage 330. Said second top carriage 272 is herein arranged substantially parallel to the assembly consisting of said bottom carriage 330 and said first top carriage 271.

Said switching configuration 360 is arranged to achieve a switching between said first top carriage 271 and said second top carriage 272, when necessary. Said switching may include moving said first top carriage 271 and said second top carriage 272 in a direction substantially perpendicular to a longitudinal direction of said feed beam 230, which longitudinal direction herein is a direction coincident with the movement of said bottom carriage 330.

Figure 6:
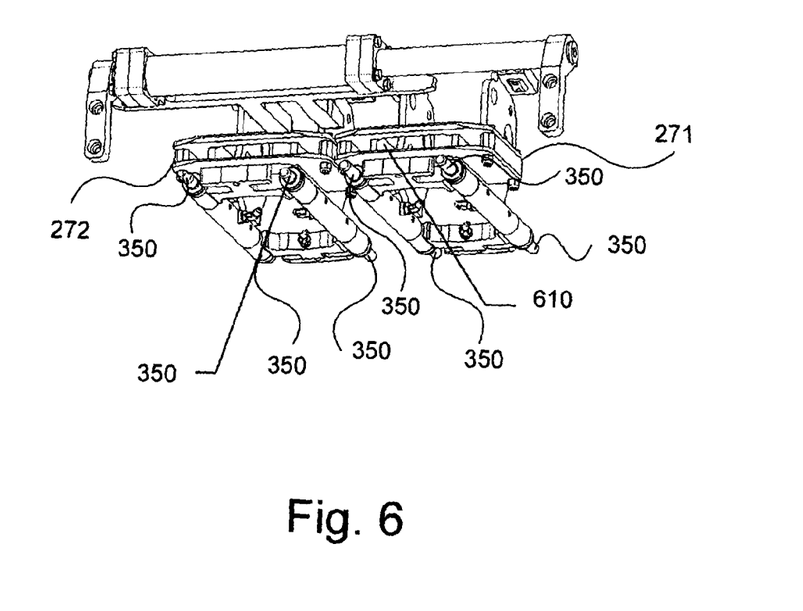
FIG. 6 schematically illustrates a carriage switching configuration, according to an embodiment of the invention.

FIG. 6 schematically illustrates a carriage switching configuration, according to an embodiment of the invention.

Hereby is illustrated said first top carriage 271 and said second top carriage 272.

Said first top carriage 271 is provided with four pins 350 that are arranged to lock said first top carriage 271 to said bottom carriage 330. According to this embodiment, said four pins 350 of the first top carriage 271 are arranged to be displaced in a direction coincident with a longitudinal direction of said feed beam 230.

Said first top carriage 271 is arranged with suitably configured recesses 610. Said recesses 610 may alternatively be through holes. Said switching tools 410 are arranged for temporarily engaging said recess 610 when switching between operational uses of said top carriage 271 and said second top carriage 272 is performed.

Said second top carriage 272 is provided with four pins 350 that are arranged to lock said second top carriage 272 to said bottom carriage 330. According to this embodiment, said four pins 350 of the second top carriage 272 are arranged to be displaced in a direction coincident with a longitudinal direction of said feed beam 230.

Said second top carriage 272 is arranged with suitably configured recesses 610. Said recesses 610 may alternatively be through holes. Said switching tools 410 are arranged for temporarily engaging said recesses 610 when switching between operational use of said second top carriage 272 and said first top carriage 271 is performed.

It should be noted that any number of pins 350 at said first top carriage 271 and said second top carriage 272 and corresponding holes at said bottom carriage 330 may be arranged.

Figure 7A:
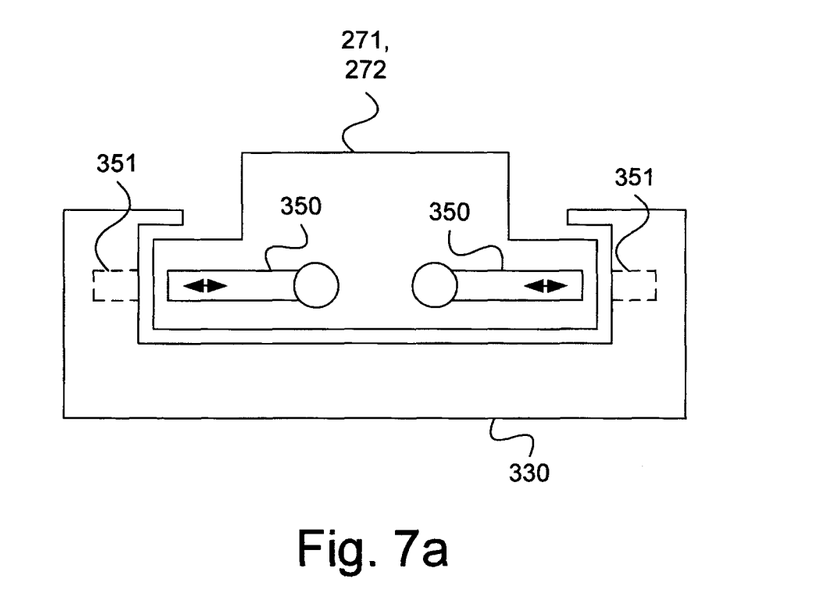
FIG. 7a schematically illustrates a carriage switching configuration, according to an embodiment of the invention.

FIG. 7a schematically illustrates a carriage switching configuration, according to an embodiment of the invention.

According to an embodiment example, said first top carriage 271 may be arranged with four locking pins 350, which are arranged to controllably be displaced in holes 351 in a direction coincident with a longitudinal direction of said feed beam 230. Said displacement directions are indicated by a double arrow.

Hereby, said four locking pins 350 are arranged to controllably be inserted into the corresponding holes 351 of said bottom carriage 330 during locking. According to an embodiment, said four locking pins 350 are arranged to controllably be inserted into the corresponding holes 351 of said bottom carriage 330 substantially simultaneously during locking.

Hereby, said four locking pins 350 are arranged to controllably be removed from the corresponding holes 351 of said bottom carriage 330 during unlocking. According to an embodiment, said four locking pins 350 are arranged to controllably be removed from the corresponding holes 351 of said bottom carriage 330 substantially simultaneously during unlocking.

The locking mechanism of the second top carriage 272 may be configured in a corresponding way as in the first top carriage 271.

Figure 7B:
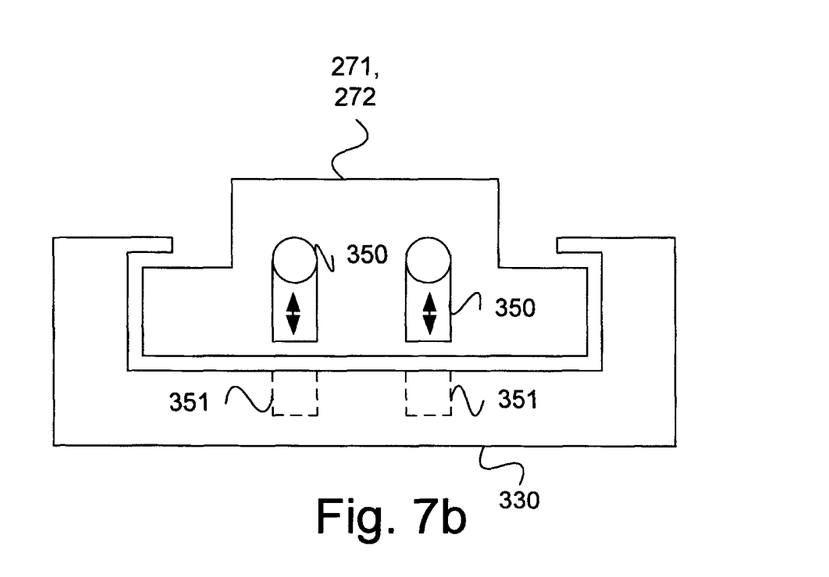
FIG. 7b schematically illustrates a carriage switching configuration, according to an embodiment of the invention.

FIG. 7b schematically illustrates a carriage switching configuration, according to an embodiment of the invention.

According to an embodiment example, said first top carriage 271 may be arranged with four locking pins 350, which are arranged to controllably be displaced in holes 351 in a direction substantially perpendicular to a longitudinal direction of said feed beam 230. Said displacement directions are indicated by a double arrow.

Hereby, said four locking pins 350 are arranged to controllably be inserted into the corresponding holes 351 of said bottom carriage 330 during locking. According to an embodiment, said four locking pins 350 are arranged to controllably be inserted into the corresponding holes 351 of said bottom carriage 330 substantially simultaneously during locking.

Hereby, said four locking pins 350 are arranged to controllably be removed from the corresponding holes 351 of said bottom carriage 330 during locking. According to an embodiment, said four locking pins 350 are arranged to controllably be removed from the corresponding holes 351 of said bottom carriage 330 substantially simultaneously during locking.

The locking mechanism of the second top carriage 272 may be configured in a corresponding way as in the first top carriage 271.

Figure 8A:
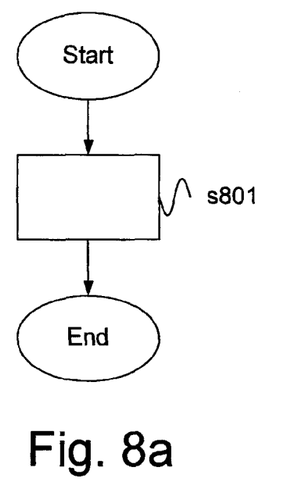
FIG. 8a schematically illustrates a flowchart for a method, according to an embodiment of the invention.

FIG. 8a schematically illustrates a flowchart of a method pertaining to a bolting configuration where a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to alternately be supported by said bottom carriage to alternately be brought into operative engagement and hereby alternately be locked relative to said bottom carriage, according to an embodiment of the invention. The method comprises a first method step S801. The step S801 comprises the step of:

said locking being performed by a locking configuration comprising at least one hydraulically, pneumatically or electrically displaceably arranged locking pin adapted for being inserted into a locking hole during locking, wherein said locking pin is supported by said one top carriage and said locking hole is arranged in said bottom carriage, or vice versa. After step S801 the method is ended.

Figure 8B:
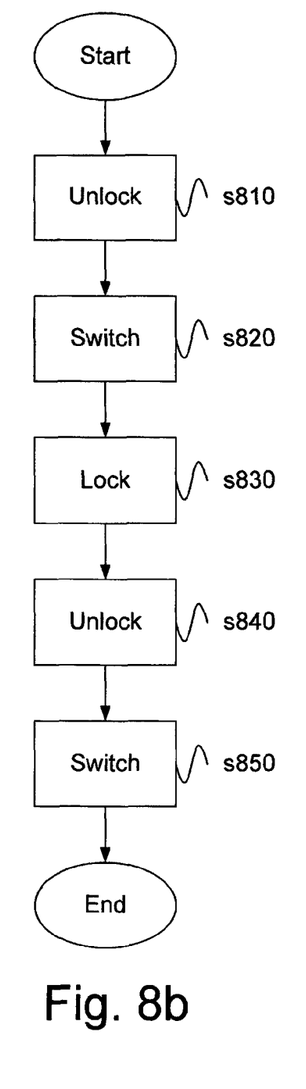
FIG. 8b schematically illustrates a flowchart for a method in further detail, according to an embodiment of the invention.

FIG. 8b schematically illustrates a flowchart of a method pertaining to a bolting configuration where a drilling unit and a bolting unit are arranged to be supported by a bottom carriage via a respective top carriage, wherein said bottom carriage is arranged to be supported by a feed beam, relative to which said bottom carriage is displaceable, wherein said top carriages are arranged to alternately be supported by said bottom carriage to alternately be brought into operative engagement and hereby alternately be locked relative to said bottom carriage, according to an embodiment of the invention.

The method comprises a first method step S810. Method step S810 comprises the step of controllably bringing said pins 350 of the first top carriage 271 to a position corresponding to an unlocked state. Said unlocking is performed by a locking configuration comprising at least one hydraulically, pneumatically or electrically displaceably arranged locking pin 350 adapted to be inserted into a locking hole 351 during locking, wherein said locking pin 350 is supported by said one top carriage and said locking hole 351 is arranged in said bottom carriage 330, or vice versa. After the method step S810 a subsequent method step S820 is performed.

The method step S820 comprises the step of switching top carriages at said bottom carriage 330 by means of said switching configuration, such that the other top carriage 272 can be brought into active engagement with said bottom carriage 330. After the method step S820 a subsequent method step S830 is performed.

The method step S830 comprises the step of controllably bringing said pins 350 of the second top carriage 272 to a position corresponding to a locked state. Said locking is performed by means of a locking configuration comprising at least one hydraulically, pneumatically or electrically displaceably arranged locking pin 350 adapted to be inserted into a locking hole 351 during locking, wherein said locking pin 350 is supported by said one top carriage and said locking hole is arranged in said bottom carriage 330, or vice versa. After the method step S830 a subsequent method step S840 is performed.

The method step S840 comprises the step of controllably bringing said pins 350 of the second top carriage 272 to a position corresponding to an unlocked state. Said unlocking may be performed in the same manner as described with reference to step s810. After the method step S840 a subsequent method step S850 is performed.

The method step S850 comprises the step of switching carriages in said bottom carriage 330 by said switching configuration 360, such that the first top carriage 271 can be brought into active engagement with said bottom carriage 330. After the method step S850 the method is ended.

Figure 9:
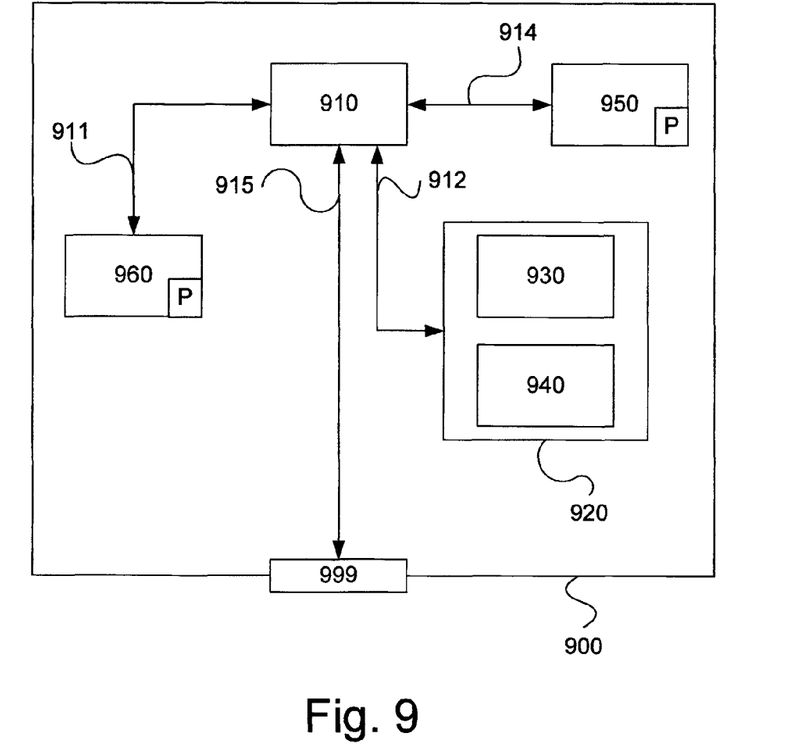
FIG. 9 schematically illustrates a computer, according to an embodiment of the invention.

Referring to FIG. 9, a diagram of an embodiment of a device 900 is shown. The control units 200 and 210 described with reference to FIG. 2 may in an embodiment comprise the device 900. The device 900 comprises a non-volatile memory 920, a data processing unit 910 and a read/write memory 950. The non-volatile memory 920 has a first memory portion 930 wherein a computer program, such as an operating system, is stored for controlling the operation of the device 900. The device 900 further comprises a bus controller, a serial communication port, I/O-body, an A/D-converter, a time and date input and transfer unit, an event counter and an interrupt controller (not shown). The non-volatile memory 920 also has a second memory portion 940.

A computer program P is provided, which comprises routines for controlling the locking and unlocking of said bottom carriage 330 according to the inventive method. The program P comprises routines for switching between said first top carriage 271 and said second top carriage 272, and vice versa. The program P may be stored in an executable manner or in a compressed manner in a memory 960 and/or in a read/write memory 950.

When it is described that the data processing unit 910 performs a specific function, it is understood that the data processing unit 910 performs a specific part of the program which is stored in memory 960, or a specific part of the program stored in read/write memory 950.

The data processing device 910 can communicate with a data port 999 via a data bus 915. The non-volatile memory 920 is adapted for communication with the data processing unit 910 via a data bus 912. The separate memory 960 is adapted to communicate with the data processing unit 910 via a data bus 911. The read/write memory 950 is adapted to communicate with the data processing unit 910 via a data bus 914. To the data port 999 may, for example, links L200 and L210 be connected (see FIG. 2).

When data is received at the data port 999 it is stored temporarily in the second memory portion 940. When the received input data has been temporarily stored, the data processing unit 910 is prepared to perform execution of code in a manner described above. According to an embodiment, the signals received at the data port 599 comprises information on control commands for switching between said first top carriage 271 and said second top carriage 272. According to an embodiment, the signals received at the data port 599 comprises information on control commands for locking and unlocking by the pins 350 of said first top carriage 271 and said second top carriage 272. The received signals at the data port 999 can be used by the device 900 in accordance with the inventive method.

Parts of the methods described herein may be performed by the device 900 using the data processing unit 910 that runs the program stored in the memory 960 or read/write memory 950. When the device 900 runs the program, the herein described methods are executed.

The previous description of the preferred embodiments of the present invention has been provided for the purpose of illustration and description of the invention. It is not intended to be comprehensive or to limit the invention to the described embodiments. Obviously, many modifications and variations will become apparent to the skilled person. The embodiments were chosen and described to best explain the principles of the invention and its practical applications, thereby allowing persons skilled in the art to understand the invention for various embodiments and with the various modifications suitable for the intended use.

The invention claimed is:

1. A method pertaining to a bolting configuration (299), wherein a drilling unit and a bolting unit are arranged to be supported by a bottom carriage (330) via a respective top carriage (271; 272), wherein said bottom carriage (330) is arranged to be supported by a feed beam (230), relative to which said bottom carriage (330) is displaceable, wherein said top carriages (271; 272) are arranged to alternately be supported by said bottom carriage (330) to alternately be brought into operative engagement and thereby alternately be locked relative to said bottom carriage (330),
wherein the steps of said method comprise:
controllably bringing a locking configuration (350; 351) comprising at least one hydraulically, pneumatically or electrically controlled, axially displaceably arranged locking pin (350) adapted to be inserted into a locking hole (351) during locking, wherein said locking pin (350) is supported by said one top carriage (271; 272) and said locking hole (351) is arranged in said bottom carriage (330), or vice versa, to a position corresponding to an unlocked state;
by means of a switching configuration (360) switching top carriages (271; 272) at said bottom carriage (330), such that the other top carriage (271; 272) can be brought into active engagement with said bottom carriage (330); and
controllably bringing said at least one locking pin (350) to a position corresponding to a locked condition, wherein said locking pin (350) is inserted into said locking hole (351).

2. The method according to claim 1, wherein said locking configuration (350; 351) is controlled, such that locking is performed by four locking pins (350) and four locking holes (351).

3. The method according to claim 2, further comprising the step of:
said units alternately being brought into operative engagement by means of said switching configuration (360), comprising switching cylinder means (360) supported by the feed beam (230).

4. The method according to claim 1, further comprising the step of:
said units alternately being brought into operative engagement by means of said switching configuration (360), comprising switching cylinder means (360) supported by the feed beam (230).

5. The method according to claim 1, further comprising the step of:
controlling said switching and/or said locking steps by an operator.

6. The method according to claim 1, further comprising the step of:
displacing said at least one locking pin (350) towards and away from said locking hole (351) by means of a hydraulic cylinder (360) supported by said top carriage (271; 272).

7. The method according to claim 1, further comprising the step of:
displacing said at least one locking pin (350) in a longitudinal direction of said feed beam (230).

8. A bolting configuration (299) comprising a drilling unit and a bolting unit, which units are arranged to be supported by a bottom carriage (330) via a respective top carriage (271; 272), wherein said bottom carriage (330) is arranged to be supported by a feed beam (230), relative to which said bottom carriage (330) is displaceable, wherein said top carriages (271; 272) are arranged to alternately be supported by said bottom carriage (330) to alternately be brought into operative engagement and thereby alternately be locked relative to said bottom carriage (330),
wherein:
a locking configuration (350; 351) for said locking, which locking configuration comprises at least one hydraulically, pneumatically or electrically controlled, axially displaceably arranged locking pin (350) adapted to be inserted into a locking hole (351) during locking, wherein said locking pin (350) is supported by said one top carriage (271; 272) and said locking hole (351) is arranged in said bottom carriage (330), or vice versa.

9. The bolting configuration according to claim 8, wherein said locking configuration comprises four locking pins (351) and four locking holes (35).

10. The bolting configuration according to claim 9, further comprising:
means (200; 210; 900; 360) for alternately bringing said units into operative engagement.

11. The bolting configuration according to claim 9, further comprising:
actuator means connected to control means (200; 210; 900), wherein said control means (200; 210; 900) are arranged to control said switching and/or said locking based on control signals from said actuator means.

12. The bolting configuration according to claim 9, wherein said at least one locking pin (350) is arranged displaceably towards and away from said locking hole (351) by means of an hydraulic cylinder (360) supported by said top carriage (271; 272).

13. The bolting configuration according to claim 8, further comprising:
means (200; 210; 900; 360) for alternately bringing said units into operative engagement.

14. The bolting configuration according to claim 8, further comprising:
actuator means connected to control means (200; 210; 900), wherein said control means (200; 210; 900) are arranged to control said switching and/or said locking based on control signals from said actuator means.

15. The bolting configuration according to claim 8, wherein said at least one locking pin (350) is arranged displaceably towards and away from said locking hole (351) by means of an hydraulic cylinder (360) supported by said top carriage (271; 272).

16. The bolting configuration according to claim 8, wherein said at least one locking pin (350) is arranged displaceably in a longitudinal direction of said feed beam (230).

17. A vehicle (100) comprising a bolting configuration (299) according to claim 8.

18. The vehicle according to claim 17, said vehicle being a drilling rig.

\* \* \* \* \*